Dec. 25, 1956  J. THEVENAZ  2,775,161
MOTION PICTURE PROJECTOR DESIGNED
FOR STEREOSCOPIC PROJECTION
Filed Dec. 2, 1953  2 Sheets-Sheet 1

INVENTOR
Jean Thevenaz.
BY
ATTORNEY

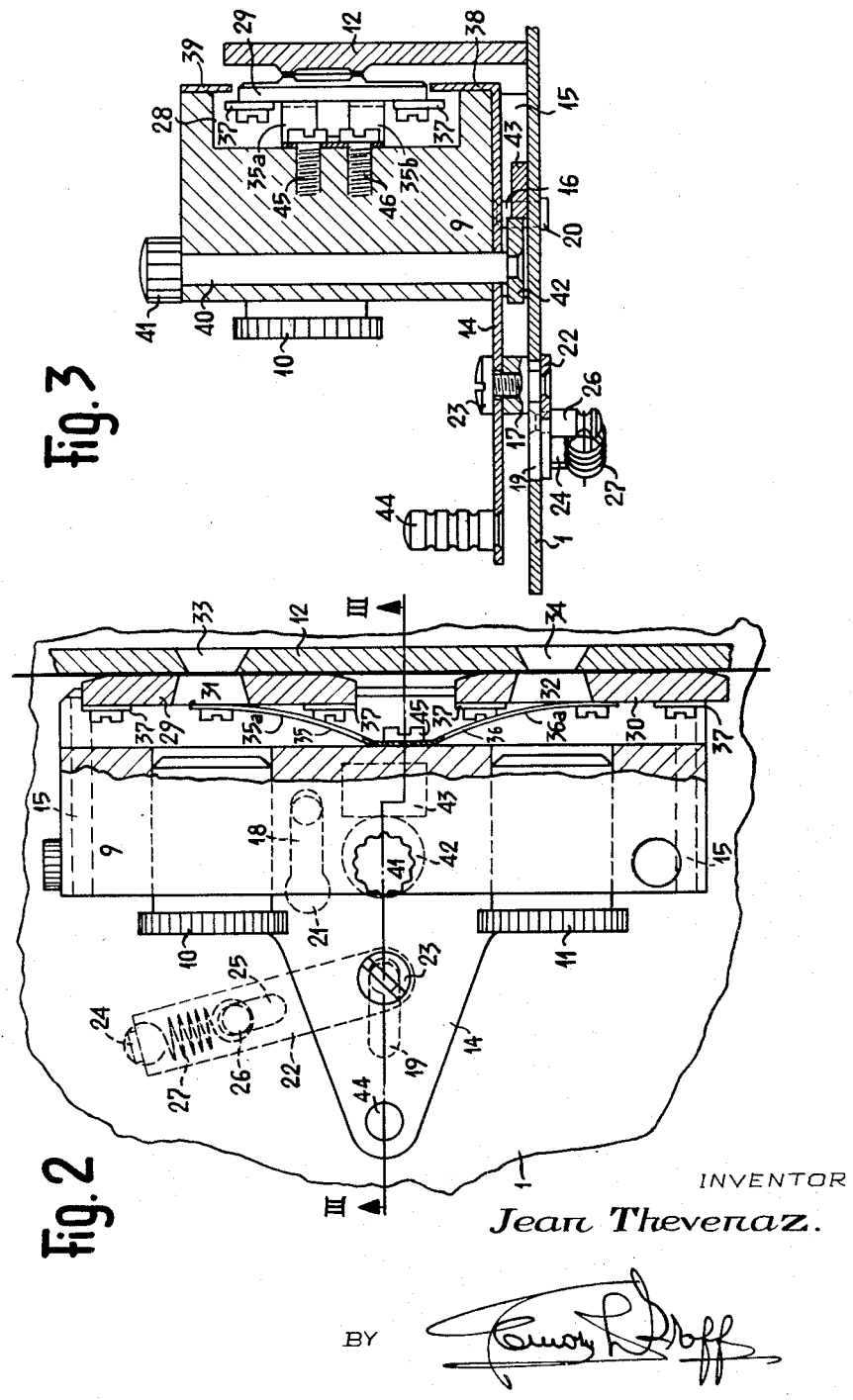

United States Patent Office 2,775,161
Patented Dec. 25, 1956

2,775,161

MOTION PICTURE PROJECTOR DESIGNED FOR STEREOSCOPIC PROJECTION

Jean Thévenaz, Grandson, Switzerland, assignor to Paillard S. A., Sainte-Croix, Switzerland, a corporation of Switzerland Application December 2, 1953, Serial No. 395,680

Claims priority, application Switzerland July 3, 1953

7 Claims. (Cl. 88—16.6)

The invention relates to a motion-picture projector intended for stereoscopic projection, wherein the film is horizontally displaced, and comprises two lenses secured on a support which is movable along the axis of projection so as to permit simultaneous adjustment of the sharpness of the two images on the screen.

The projector of the present case comprises at least one pressure plate to hold the film firmly in the film gate and is characterized by the fact that the pressure plate is connected to the support for the lenses by an elastic element in such a way as to enable the said support to occupy different positions with respect to the plane of the film for the purpose of focusing the images on the screen without changing the position of the pressure plate relative to the film.

The accompanying drawing shows, diagrammatically and by way of example, one form of construction of a projector according to the present invention.

Figure 2 shows the two lenses on their support on a larger scale and with a partial breakaway.

Figure 3 is a section along III—III of Figure 2.

Similar references designate like parts in the several views.

Figure 1:
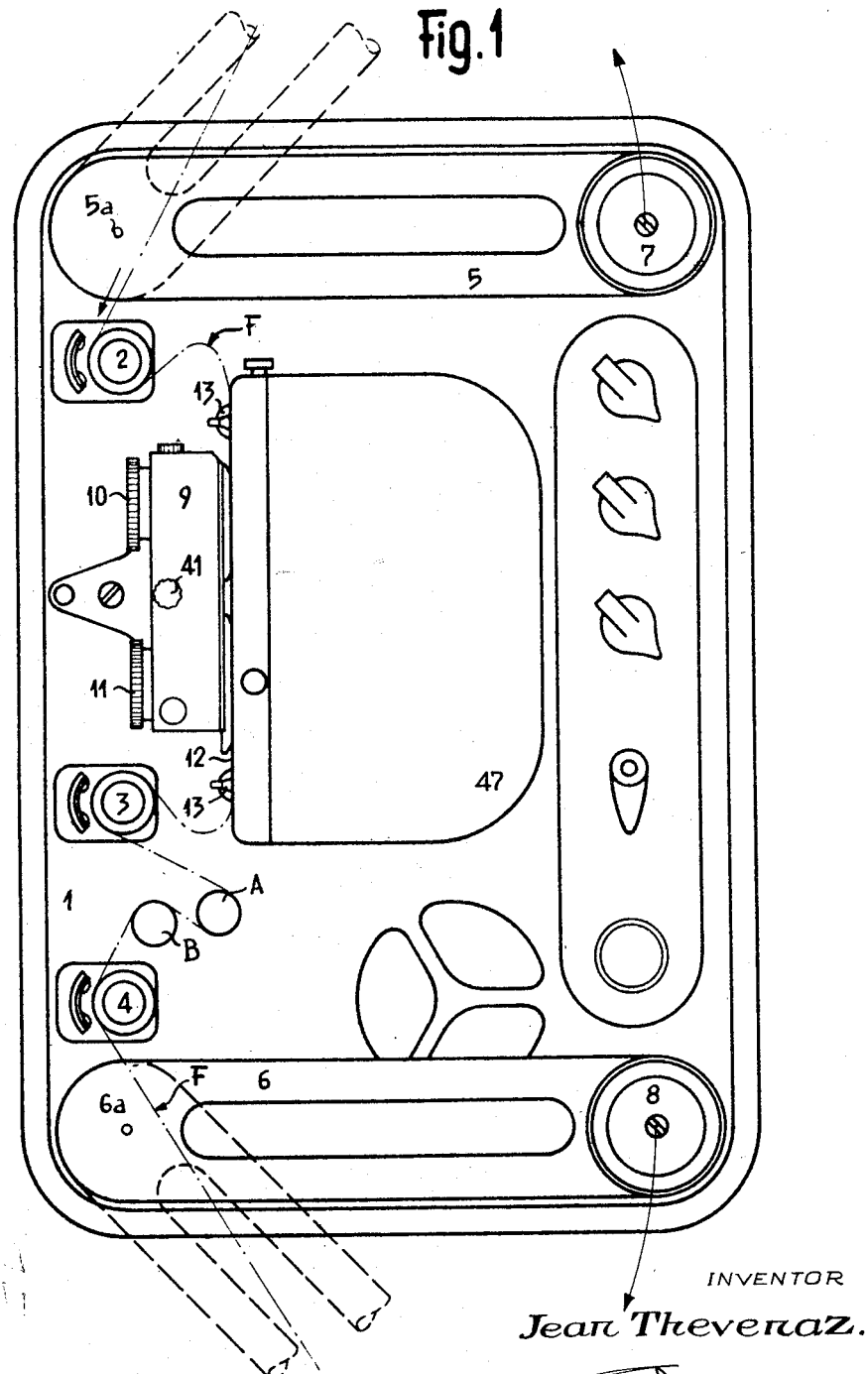
Figure 1 is a plan view of the projector.

With reference to Figure 1, the projector includes a wall 1 on which are mounted three feed sprockets 2, 3 and 4 provided to assure driving of the film at a constant rate of speed.

Two arms 5 and 6 are hinged as indicated at 5a and 6a, respectively, at one of their ends to the projector wall 1 and are adapted to support at their other ends 7 and 8 the film feed and take-up reels. Figure 1 shows these arms in solid lines in their turned-in position, but for projection purposes they are turned outward as shown by dotted lines so as to move their ends 7 and 8 away from the wall 1 and make it possible to place the take-up and feed reels in position.

Between feed sprockets 2 and 3 the film F must pass between a support for the two lenses 10 and 11 and a frontal plate or gate 12. The latter supports members 13 for the transverse guiding of the film. A conventional mechanism (not shown) is provided to assure the intermittent movement of that part of the film which passes between the lenses 10 and 11 and a suitable light source located in a housing 47. Between feed sprocket 3 and 4 the film F passes over a sound-reproducing drum A and a tension roller B.

A lens support in the form of a block 9 is rigidly secured to a carriage 14 whose lower face is slidably supported on the rails 15 which are integral with the upper wall 1 of the projector casing. The carriage 14 has affixed thereto two studs 16 and 17 adapted to cooperate with parallel spaced and staggered slots 18 and 19, respectively, provided in the upper wall 1 to assure proper guiding of the lens supporting block in its sliding movement.

Stud 16 is riveted on carriage 14 and has a head 20 whose diameter is larger than the width of the rail portion of the key slot 18. The latter has, of course, an enlarged end or eye 21 to permit the passage of head 20 of stud 16.

Stud 17 is secured to arm 22 beneath wall 1 and connected with carriage 14 by means of a screw 23. Arm 22 has an offset portion 24 at one of its ends and a medial elongated slot 25 adapted to cooperate with a stud 26 rigidly secured to the underside of projector wall 1. A coil spring 27 exerts a tension effect between stud 26 and the offset portion 24 of the arm 22 for the purpose of maintaining carriage 14 yieldingly in each of the extreme positions which it can occupy by moving along the axis of projection. In other words, the spring biased arm acts as a snubber to hold the carriage in either of its extreme positions.

Block 9 has a recess 28 in which are housed two pressure plates 29 and 30 provided with openings 31 and 32, respectively, adapted to occupy a position opposite the projection apertures 33 and 34 provided in gate 12. Each of the pressure plates 29 and 30 is connected to block 9 by the spaced spring fingers 35a, 35b, and 36a, 36b, respectively, of a generally H-shaped leaf spring whose central web is fastened to block 9 by two screws 45, 46. The spring fingers 35b and 36b are not visible in Fig. 2 because they are hidden by fingers 35a and 36a. Pressure plates 29 and 30 are of rectangular shape and, near their ends, are provided with stop elements 37, respectively intended to engage with a bent-back flange 38 of carriage 14 and against a strip 39 secured to block 9, so as to prevent them from being completely thrust out of the recess 28 under the action of springs 35 and 36.

The lens block 9 is also bored to receive a shaft 40, the upper end of which supports a manually manipulated control button 41 while its lower end has a cam 42 intended to bear against a cam abutment 43 integral with the upper wall 1 of the projector casing. Carriage 14 supports a handle 44 permitting the carriage's easy displacement.

The position of lenses 10 and 11 in block 9 is adjusted during the assembling in such a way that the two lenses are brought into focus at the same time. Thereafter it will be sufficient to displace the support as a whole with respect to the film to obtain the simultaneous focusing of the two images projected by the two lenses. This adjustment is obtained by turning the cam 42 by means of control button 41, which changes the extreme position into which the lens supporting block is moved by the action of spring 27 associated with snubber arm 22.

It is advantageous to use springs 35 and 36 whose ratio of compression to the pressure plates is very small so that the pressure exerted on the film by said plates 29 and 30 remains substantially the same for the different positions which the block 9 may have to occupy with respect to the frontal plate 12 in order to obtain adjustment.

To introduce the film into the gate, it will merely be necessary to pull the lens support 9 forward by means of handle 44 on the carriage 14 until stud 17 comes to bear against the forward end of slot 19. The lens support is then held in that position by the effect of spring 27 on arm 22. Pressure plates 29 and 30 are moved away from frontal plate 12 and, with their stop elements 37, come to bear against the flange 38 and strip 39 respectively, and which extend along the upper and lower edges of recess 28. The movement of the pressure plates to normal film engaging position is effected by pushing the lens support 9 in the opposite direction.

The lenses and their support can be removed very easily because it will be sufficient to place the support in the position in which the pressure plates are relaxed or open and then unscrew screw 23 to remove the lens assembly by raising it so as to enable head 20 of stud 16 to pass through the eye 21 of slot 18.

The lens support herein described is of very simple construction and it is extremely easy to use since all that is needed is to manipulate the single turn-button 41 in order to bring the two projected images simultaneously into focus.

It will, of course, be understood that modifications could be applied to the said support. In particular, the two pressure plates 29 and 30 could be replaced by a single pressure plate with two openings. Also modified types of springs could be used to apply the pressure plates against the gate formed by gate plate 12. Similarly, the spring arrangement 27, adapted to maintain the support in each of its two extreme positions, could be replaced by any other equivalent arrangement, and the adjustable stop could be formed by a screw whose end cooperates with a fixed stop. In the form of construction shown in the drawing, the eccentric 42 could also be mounted on the upper plate 1 and cooperate with a stop secured to the lens support.

I claim:

1. A stereoscopic motion picture projector wherein the film is displaced horizontally, comprising, in combination, a gate member having a pair of apertures, a lens support member, a pair of lenses fixedly mounted on said support member, said lenses being positioned on said support member in cooperative relationship with said apertures, at least one pressure plate means on said support for normally pressing film against said gate member, means for elastically connecting said pressure plate to said support, said means including at least one spring member, means for adjusting the lens support in the direction of the focus axis of each of said lenses, whereby the two projected images may be simultaneously focused without changing the position of the pressure plate with respect to the film and the said support may occupy a different position with respect to the plane of the film, and means for moving the lens support and the pressure plate connected thereto from the said gate, whereby film may be easily introduced into the gate.

2. A stereoscopic motion picture projector, wherein the film is displaced horizontally, comprising, in combination, a projector wall member having parallel slots therein, a gate member positioned on said wall perpendicular thereto, said gate member having a pair of projection apertures, a shiftable carriage having a horizontal portion and an upturned flange, said carriage having a pair of studs positioned thereon in cooperative relationship with said parallel slots of said projector wall member, a pair of rails integral with said wall, said horizontal portion of said carriage being slidably positioned on said rails, a lens support mounted on said carriage and against said flange, a pair of lenses fixedly mounted on said support, said support having a recess facing said gate member, a pressure plate mounted in said recess, spring means for connecting said plate to said support and for urging said plate toward said gate, means for adjusting the lens support in the direction of the focus axis of each of said lenses, said means being operatively connected to said support and to said wall, whereby the two projected images may be simultaneously focused without changing the position of the pressure plate with respect to the film and the said support may occupy a different position with respect to the plane of the film, means for moving the carriage having the said lens support and the pressure plate thereon from said gate, and means for releasably holding said carriage in its shifted position, whereby the lens support and the pressure plate may be moved from the gate and film may be easily introduced into the gate.

3. The stereoscopic motion picture projector of claim 2 wherein the means for releasably holding said carriage in its shifted position includes a third stud rigidly positioned on said wall and a spring biased arm means operatively connected with said third stud and with one of said pair of studs for holding the carriage withdrawn in relation to the gate when the carriage is manually moved.

4. The stereoscopic motion picture projector of claim 2 wherein the means for releasably holding said carriage in its shifted position includes a third stud rigidly positioned on said wall and a spring biased arm means operatively connected with said third stud and with one of said pair of studs for holding the carriage withdrawn in relation to the gate when the carriage is manually moved, the said upturned flange overlies a portion of said support recess, a strip being in the same plane as said flange and integral with said support extends over a portion of said recess, and the pressure plate is provided with stop means for engaging said flange and said strip when the frame is manually moved in moving the pressure plate away from said gate.

5. The stereoscopic motion picture projector of claim 2 wherein the means for releasably holding said carriage in its shifted position includes a third stud rigidly positioned on said wall and a spring biased arm means operatively connected with said third stud and with one of said pair of studs for holding the carriage withdrawn in relation to said gate when the carriage is manually moved and means for adjusting the lens support in the direction of the focus axis of each of said lenses includes a shaft extending through said lens support and said carriage to said wall, said shaft having its vertical axis on a plane parallel to the plane of said gate member, control knob on one end of said shaft, a cam on the end of said shaft adjacent said wall, and an abutment means on said wall for engaging said cam.

6. The stereoscopic motion picture projector of claim 2 wherein the means for moving the carriage having the said lens support and the pressure plate thereon from said gate includes a handle and the means for releasably holding said carriage in its shifted position includes a stud positioned on said carriage, a screw means for securing said carriage to said stud, an arm operatively connected to said stud, said arm having a medial longitudinal slot and an offset position at one end thereof, another stud on said wall in cooperative relationship with said other stud, and a spring anchored at one end to said other stud and at the other end to said offset portion of said arm.

7. The stereoscopic motion picture projector of claim 2 wherein the means for connecting said pressure plate to said lens support and for urging said plate toward said gate includes an H-shaped spring having its medial portion secured by said support and having its extremities bear against said pressure plate.

References Cited in the file of this patent

UNITED STATES PATENTS

| | | |
|---|---|---|
| 1,291,954 | Losey | Jan. 21, 1919 |
| 2,366,084 | Briskin | Dec. 26, 1944 |